(12) United States Patent
Anacker et al.

(10) Patent No.: US 6,289,820 B1
(45) Date of Patent: Sep. 18, 2001

(54) HYBRID GAS GENERATOR

(75) Inventors: Lothar Anacker, Kersbach; Karl Bayer, Berg; Eduard Berenz, Furth; Uwe Brede, Furth; Anton Bretfeld, Furth; Josef Kraft, Berg; Gerrit Scheiderer, Furth; Waldemar Weuter, Furth; Jiang Zhang, Nuremberg, all of (DE)

(73) Assignee: Dynamit Nobel GmbH Explosivstoff-und Systemtechnik, Troisdorf (DE)

( * ) Notice: Subject to any disclaimer, the term of this patent is extended or adjusted under 35 U.S.C. 154(b) by 0 days.

(21) Appl. No.: 09/331,778

(22) PCT Filed: Dec. 19, 1997

(86) PCT No.: PCT/EP97/07164

§ 371 Date: Sep. 1, 1999

§ 102(e) Date: Sep. 1, 1999

(87) PCT Pub. No.: WO98/28168

PCT Pub. Date: Jul. 2, 1998

(30) Foreign Application Priority Data

Dec. 24, 1996 (DE) ................................................ 196 54 315

(51) Int. Cl.⁷ ............................. C06D 5/00; B60R 21/26
(52) U.S. Cl. ......................... 102/530; 280/737; 280/741
(58) Field of Search ................................... 280/736–741; 102/530–531

(56) References Cited

U.S. PATENT DOCUMENTS

| | | | |
|---|---|---|---|
| 3,758,131 | * | 9/1973 | Stephenson et al. ............... 280/150 |
| 3,773,353 | * | 11/1973 | Trowbridge et al. ............... 280/150 |
| 3,774,807 | * | 11/1973 | Keathley ................................. 222/3 |
| 3,788,667 | * | 1/1974 | Vancil ................................. 280/737 |
| 3,834,412 | * | 9/1974 | Fannin ................................. 137/68 |
| 3,865,273 | * | 2/1975 | Zeigler ................................. 222/3 |
| 3,868,124 | * | 2/1975 | Johnson ............................... 280/150 |
| 3,948,540 | * | 4/1976 | Meacham ............................ 280/741 |
| 4,950,458 | * | 8/1990 | Cunningham ....................... 280/741 |
| 5,273,312 | * | 12/1993 | Coutlas et al. ...................... 280/737 |
| 5,460,406 | * | 10/1995 | Faigle .................................. 280/741 |
| 5,462,307 | * | 10/1995 | Webber et al. ..................... 280/737 |
| 5,564,743 | * | 10/1996 | Marchant ............................ 280/741 |
| 5,566,976 | * | 10/1996 | Cuevas ................................ 280/737 |
| 5,630,619 | * | 5/1997 | Buchanan et al. ................. 280/741 |
| 5,690,357 | * | 11/1997 | Cuevas ................................ 280/737 |
| 5,695,216 | * | 12/1997 | Sandstrom et al. ................ 280/737 |
| 5,794,973 | * | 8/1998 | O'Loughlin et al. ............... 280/737 |
| 5,799,973 | * | 9/1998 | Bauer et al. ........................ 280/741 |
| 5,803,494 | * | 9/1998 | Headley .............................. 280/741 |
| 5,851,027 | * | 12/1998 | DiGiacomo et al. ............... 280/736 |
| 5,857,699 | * | 1/1999 | Rink et al. .......................... 280/737 |
| 5,934,705 | * | 8/1999 | Siddiqui et al. .................... 280/736 |
| 6,019,389 | * | 2/2000 | Burgui et al. ....................... 280/736 |
| 6,032,979 | * | 3/2000 | Mossi et al. ........................ 280/741 |

FOREIGN PATENT DOCUMENTS

2227153 * 11/1974 (FR) .

* cited by examiner

Primary Examiner—Harold J. Tudor
(74) Attorney, Agent, or Firm—Antonelli, Terry, Stout & Kraus, LLP

(57) ABSTRACT

The hybrid gas generator to inflate airbags comprises two combustion chambers (14, 16), in each of which a solid material charge (15, 17) is placed, and a storage chamber (11) containing a pressurized storage gas. The storage chamber (11) is connected to diffusion chamber (30) by a closing member (29) which can be perforated. The first solid material charge (15), and the second solid material charge (17) can, for instance, can be sequentially ignited by separate igniter elements (18, 19), thereby determining the pressure accumulation.

6 Claims, 5 Drawing Sheets

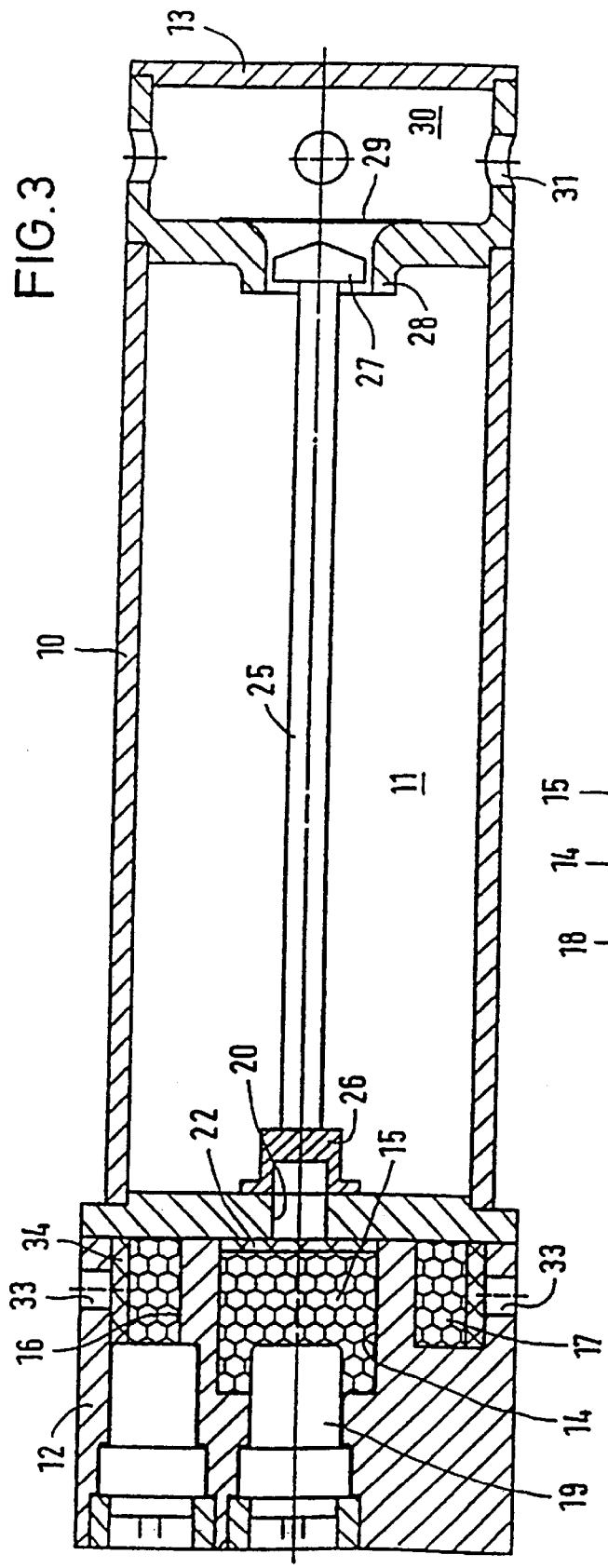

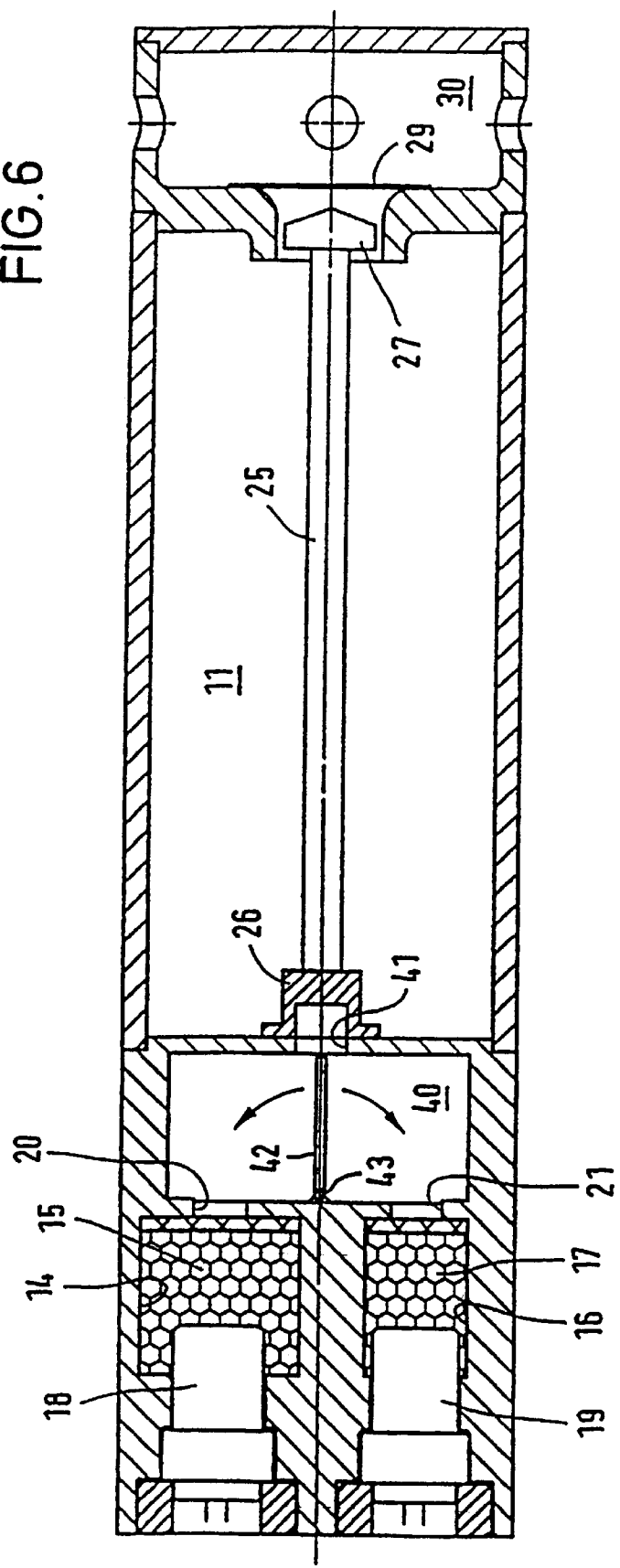

HYBRID GAS GENERATOR

BACKGROUND OF THE INVENTION

The invention relates to a hybrid gas generator which contains an ignitable, gas-generating solid charge and a storage chamber containing a gas.

A hybrid gas generator for air bags is known from EP 0 616 578 B1, which contains an ignitable solid charge in a combustion chamber and a pressurized gas in a storage chamber. Upon the initiation of the gas generator, an ignition element ignites the solid charge. A hollow piston is driven by the combustion gases which are generated, with the hollow piston pushing through a closure element which closes the storage chamber, and with the pressurized gas contained in the storage chamber being able to flow out to the outlet. Moreover, the combustion gases generated by the solid charge flow into the storage chamber, where they mix with the compressed gas. When the closure element is destroyed, first of all cold compressed gas flows to the outlet. This prevents the hot combustion gases from arriving in the air bag first. Subsequently, a mixture of cold gas and combustion gas flows into the air bag.

Moreover, a hybrid gas generator is known from EP 0 669 231 A2, where a mixing chamber is arranged between a combustion chamber containing the solid charge and a storage chamber containing a compressed gas. The combustion chamber and the storage chamber are sealed by sealing discs which are destroyed by the combustion gases of the solid charge. In this respect, the combustion gas and the cold gas penetrate from opposite directions into the mixing chamber, with the flowing-out being impeded as a result. Moreover, the hot combustion gas loaded with harmful substances flows out initially because the sealing disc of the combustion chamber is the first one to be destroyed.

The known hybrid gas generators have a pressure buildup behaviour determined by their construction, with the maximum pressure and the pressure increase gradient being specified. In the process, the air bag connected to the gas generator is inflated very quickly and in one go. In the process, the passengers can be injured by the air bag if they are "out of position".

SUMMARY OF THE INVENTION

The object of the invention is to create a hybrid gas generator which makes it possible to control the course of the pressure build-up with time in order to effect greater safety for the passengers.

With the gas generator in accordance with the invention, two solid charges are provided in different combustion chambers, with the second solid charge being ignitable in a time-delayed manner in relation to the first solid charge. In this way, the gas generation takes place with two different pressure increase gradients, with preferably first of all a relatively flat pressure increase and then a steeper pressure increase being realized. The instant of the steeper pressure increase can be determined very accurately by the ignition delay. The two solid charges can also be of different sizes or can provide different quantities of gas. The percentage pressure distribution of the entire charge to the two individual charges makes a purposeful influencing of the pressure characteristic possible. Within the scope of the invention, it is even possible to provide, in addition to the two solid charges, at least one further solid charge.

The hybrid gas generator in accordance with the invention makes the realization of different types of pressure build-up characteristics possible, indeed not only by means of the purposeful distribution of the charges and the control of the ignition procedures, but also by means of other structural modifications, for example the dimensioning of the cross section of the outflow openings.

According to a preferred development of the invention, the first solid charge and the closure element are arranged at opposite ends of the storage chamber, and the pushing element extends through the storage chamber. In this respect, the length of the pushing element can be varied in order to realize different pressure build-up characteristics. A further parameter is the dwell time of the combustion gases in the storage chamber before the closure element is opened. In this way, the heat transmission between the combustion gas and the storage gas can be influenced, this affecting the maximum pressure and the pressure increase gradient.

Further advantages and features of the invention are evident from the following description of various exemplifying embodiments.

BRIEF DESCRIPTION OF THE DRAWINGS

In the following, exemplifying embodiments of the invention will be explained in more detail with reference to the drawings.

FIG. 3 shows a further embodiment of the gas generator with an annular second solid charge.

FIG. 4 shows an exemplifying embodiment where the solid charges are coupled to each other pyrotechnically, so that the ignition takes place with only one ignition element.

FIG. 6 shows a further exemplifying embodiment with a valve which protects the second solid charge against back-igniting when the first solid charge burns away.

DETAILED DESCRIPTION OF THE PREFERRED EMBODIMENTS

Figure 1:
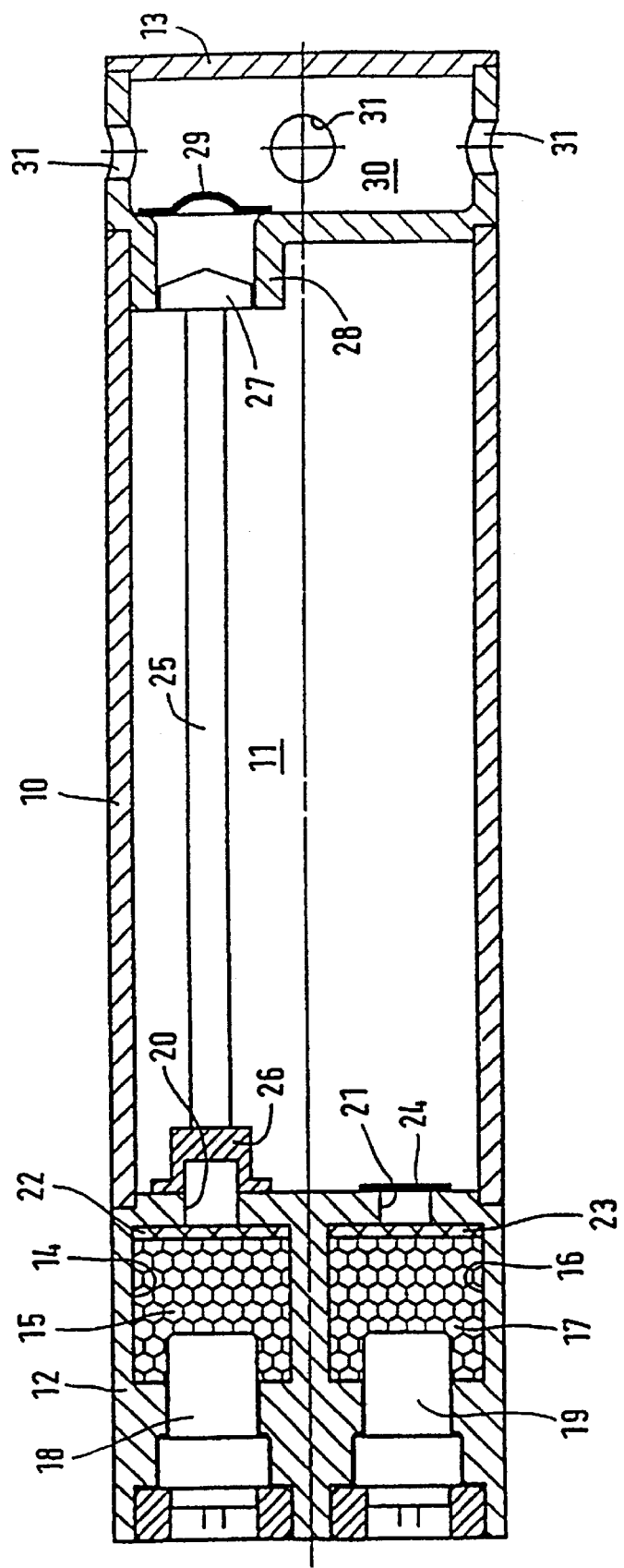
FIG. 1 shows a first embodiment of the gas generator in the stand-by state.
Figure 2:
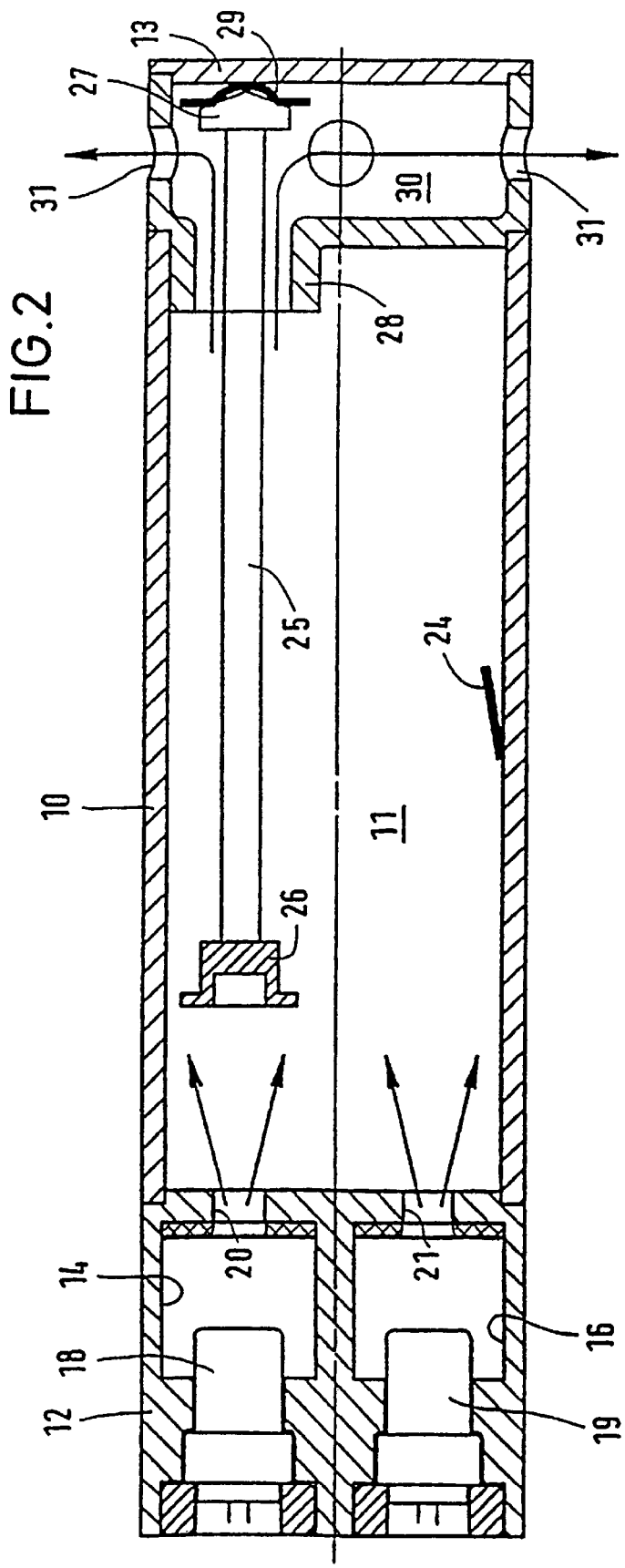
FIG. 2 shows the gas generator according to FIG. 1 after the burning-away of the solid charges.

With the gas generator according to FIGS. 1 and 2 a tubular housing 10 is provided, the interior of which forms the storage chamber 11. At the one end the housing 10 is sealed by a charge head 12 and at the opposite end by a diffuser head 13.

The charge head 12 contains, next to each other, a first combustion chamber 14 with a first solid charge 15 and a second combustion chamber 16 with a second solid charge 17. The solid charges 15, 17 are pyrotechnic charges. The solid charge 15 is allocated a first ignition element 18 and the solid charge 17 is allocated a second ignition element 19. The ignition elements 18, 19 are accommodated in the charge head 12 and they project into the respective combustion chamber. The ignition elements can be electrically ignited by a control part (not shown). They contain a respective ignition charge which burns away and thereby ignites the associated solid charge 15 or 17.

The combustion chamber 14 has an outflow opening 20 leading into the storage chamber 11, and the combustion chamber 16 has an outflow opening 21 which likewise leads into the storage chamber 11. A perforated disc 22 or 23 which keeps back the solid charge is arranged in front of the respective outflow opening 20 or 21 in the interior of the respective combustion chamber. The perforated discs 22, 23 are to keep back the solid particles when the solid charges burn away, until complete combustion has taken place. Moreover, the outflow opening 21 is sealed by a membrane or bursting disc 24 which is likewise destroyed or opened by way of the gas pressure.

The storage chamber 11 contains a pressurized storage gas. A pushing element 25 in the form of a rod extends through the storage chamber, the pushing element being provided at the end facing the combustion chamber 14 with a cap 26 covering the outflow opening 20 and having a plunger 27 at the opposite end. The plunger 27 is guided in a tube guide 28 of the diffuser head 13. The tube guide 28 is sealed by a closure element 29 which the plunger 27 can push through or push off in order to open the passage from the storage chamber 11 to the diffuser chamber 30 contained in the diffuser head 13. Outflow openings 31 lead from the diffuser chamber 30 into the area surrounding the housing 10, with the area being connected to the air bag (not shown).

In the event of initiation, first of all the ignition element 18 is electrically ignited, which for its part ignites the first solid charge 15. As a result of the pressure of the combustion gases, the pushing element 25 is axially moved in order to push open the closure element 29. The hot combustion gases flow from the combustion chamber 15 into the storage chamber 11, where they mix with the cold storage gas. The gas mixture flows into the diffuser chamber 30 and out of the latter through the outflow openings 31. After the initiation of the first ignition element 18 the second ignition element 19 is electrically initiated, even before the pressure in the storage chamber 11 has declined. A steep pressure increase is produced by way of the burning-away of the second solid charge 17, with the steep pressure increase being attributable to the fact that both solid charges 15, 17 now burn away simultaneously. The pressure characteristic and the value of the maximum pressure reached and the instant of the steeper pressure increase are determined by means of the two solid charges 15, 17, the quantities of which are coordinated with each other, and by means of the time-delayed ignition of the solid charges. The instant when the closure element 29 is pushed open is determined by the length of the pushing element 25. Furthermore, the heat transmission between the combustion gas and the storage gas is influenced by the residence time of the hot combustion gas of the storage chamber 11 before the closure element 29 is pushed open, this affecting the maximum pressure and the pressure increase gradient.

FIG. 2 shows the end state of the hybrid gas generator after the burning-away of both solid charges. The plunger 27 with the closure element 29 is now located in the diffuser chamber 30, and all outflow openings 20, 21 and the tube guide 28 are open.

Whereas in the first exemplifying embodiment the two solid charges are arranged next to each other, in the exemplifying embodiment of FIG. 3 the second solid charge 17 is contained in an annular combustion chamber 16 which surrounds the centrally arranged combustion chamber 14. The outflow opening 20 of the first combustion chamber 14 is arranged along the central axis of the storage chamber 11. The annular second combustion chamber 16 has outflow openings 33 which do not lead into the storage chamber 11, but are directed radially to the outside so that the escaping hot gas flows directly into the area surrounding the housing 10 and mixes there with the remaining gas mixture which has issued from the diffuser chamber 30. Filters 34 in front of the radial outflow openings 33 are to keep back the solid particles of the solid charge until complete combustion has taken place.

As a result of gas pressure, the combustion gas of the solid charge 15 separates the connection between the container 10 and the cap 26 at a predetermined breaking point, so that the combustion gases enter into the storage chamber 11. Here they mix with the storage gas, and the gas mixture flows into the diffuser chamber 30. After the ignition of the first solid charge 15, the second solid charge 17 is ignited in a time-delayed manner.

In the exemplifying embodiment of FIG. 4 only the first solid charge 15 is coupled to an ignition element 18. The two combustion chambers 14, 16 are connected to each other by way of a bridge 34. The bridge 34 can contain a pyrotechnic delay line, a heat-transmitting wall part or a wall which can be destroyed when the solid charge 15 is burned away. During the burning-away of the first solid charge 15, the thermal or pyrotechnic ignition of the second solid charge 17 takes place by way of the bridge 34. The advantage of this variant lies in that only an electrical signal has to be emitted to the gas generator. The ignition element 19 in FIG. 4 can therefore be dispensed with. However, if the ignition element 19 is present, optionally the one or the other ignition element 18, 19 can be activated first of all, so that, depending on the ignition element which is actuated, another characteristic of the pressure distribution is obtained.

Figure 5:
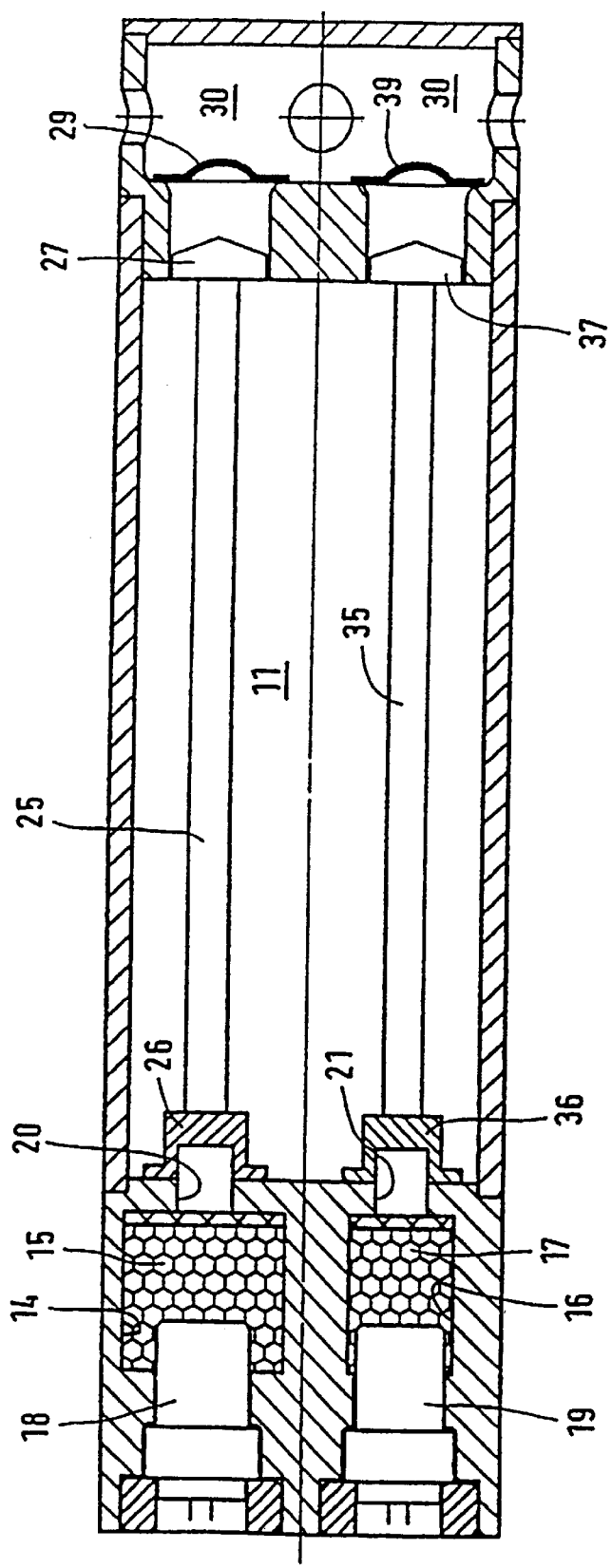
FIG. 5 shows an exemplifying embodiment with separate pushing elements which are allocated to the individual solid charges.

In the exemplifying embodiment of FIG. 5, two solid charges 15, 16 of different sizes are provided, each of which has its own ignition element 18 or 19. As in the first exemplifying embodiment, the first solid charge 15 drives a pushing element 25, and the second solid charge 17 is allocated a further pushing element 35 which leads through the storage chamber 11 and covers the outflow opening 21 with a cap 36. At the end of the second pushing element 35 there is a plunger 37 for pushing open a closure element 39 which seals the storage chamber 11 against the diffuser chamber 30. Either of the two solid charges 15, 16 can be the first one to be ignited, and the other solid charge is thereafter ignited after a certain delay. The solid charge which ignites first opens the relevant closure element 29, 39 of the storage chamber 11. The gas mixture is additionally heated by the solid charge which is ignited last.

In the exemplifying embodiment of FIG. 6, likewise each of the two solid charges 15, 17 is allocated its own ignition element 18, 19. The outflow openings 20, 21 lead into a collecting chamber 40 which is connected to the storage chamber 11 by way of an outflow opening 41. The outflow opening 41 is covered by the cap 26 which is connected to the pushing element 25. As a consequence of the collecting chamber 40 it is possible, by using a single pushing element 25, to ignite either of the two solid charges 15, 17 first as a matter of choice. Because the explosive charges have different sizes and/or different structures, the pressure generation characteristics can be selected by means of suitable activation of the ignition elements 19, 20.

The collecting chamber 40 contains a valve 42 in the form of a shutter, which can be pivoted about an axis 43. If the solid charge 15 is ignited first, the valve 42 in front of the outflow opening 21 of the other solid charge 17 shuts, in order to prevent this solid charge 17 from being ignited by the collecting chamber 40. If, on the other hand, the solid charge 17 is ignited first, the valve 42 in front of the outflow opening 20 of the other solid charge 15 shuts.

What is claimed is:

1. Hybrid gas generator with a first solid charge arranged in a first combustion chamber, a storage chamber containing a compressed gas, which storage chamber is sealed by a closure element, and a pushing element pushing open the closure element under the pressure of the combustion gases, characterized in that a second combustion chamber is provided, which contains a second solid charge, which is ignitable in a time-delayed manner in relation to the first solid charge, the two combustion chambers being connected to a collecting chamber which has an outflow opening connected to the pushing element, with each of the solid charges being provided with its own ignition element, and that solid charge which is to burn away first being able to be selected by the activation of the relevant ignition element.

2. Hybrid gas generator according to claim 1, characterized in that the first solid charge and the closure element are arranged at opposite ends of the storage chamber, and the pushing element extends through the storage chamber.

3. Hybrid gas generator according to claim 1, characterized in that a valve is provided, which protects the second solid charge against back-igniting when the first solid charge burns away.

4. A hybrid gas generator comprising:

a storage chamber containing a compressed gas, the storage container being sealed by a closure element;

a first combustion chamber containing a first solid charge and having a first outflow opening for releasing combustion gases;

a second combustion chamber containing a second solid charge and having a second outflow opening for releasing combustion gases;

means for igniting the second solid charge in a time-delayed manner in relation to the first solid charge;

a collecting chamber connected to the first and second outflow openings and having an outflow opening; and a pushing element provided between the outflow opening of the collecting chamber and the closure element of the storage chamber for pushing open the closure element under pressure of combustion gases.

5. A hybrid gas generator according to claim 4, wherein the means for igniting the second solid charge in a time-delayed manner in relation to the first solid charge comprises a first ignition element for igniting the first solid charge and a second ignition element for igniting the second solid charge.

6. A hybrid gas generator according to claim 5, wherein the means for igniting the second solid charge in a time-delayed manner in relation to the first solid charge further comprises a valve movable between a neutral position, a position closing the first outflow opening of the first combustion chamber in response to combustion gases released first from the second combustion chamber and a position for closing the second outflow opening of the second combustion chamber in response to combustion gases released first from the first combustion chamber.

* * * * *